United States Patent [19]
McDonnell et al.

[11] Patent Number: 6,128,749
[45] Date of Patent: Oct. 3, 2000

[54] CROSS-CLOCK DOMAIN DATA TRANSFER METHOD AND APPARATUS

[75] Inventors: David J. McDonnell, Fair Oaks; Andrew M. Volk, Granite Bay; Michael W. Williams, Citrus Heights, all of Calif.

[73] Assignee: Intel Corporation, Santa Clara, Calif.

[21] Appl. No.: 09/186,046

[22] Filed: Nov. 3, 1998

[51] Int. Cl.$^7$ .............................. G06F 13/00; G06F 1/04
[52] U.S. Cl. .............................................. 713/600; 710/58
[58] Field of Search ................................... 713/600, 400, 713/503; 710/58, 60, 61; 711/167

[56] References Cited

U.S. PATENT DOCUMENTS

| | | | |
|---|---|---|---|
| 5,884,100 | 3/1999 | Normoyle et al. | 710/52 |
| 5,898,889 | 4/1999 | Davis et al. | 710/29 |
| 5,909,563 | 6/1999 | Jacobs | 710/129 |
| 6,000,037 | 12/1999 | Herbert | 713/400 |

OTHER PUBLICATIONS

A.S. Sedra, K.C. Smith, "Microelectronics Circuits", $2^{nd}$ Edition, CBS College Publishing, 1987, pp. v–xi, 883–886.
Advanced Information, "Direct Rambus Clock Generator", DRCG Data Sheet, Rambus Inc., www.rambus.com, DL0056–00.05, Feb. 1998, pp. 1–8.
Advanced Information, "Direct RAC Data Sheet", Rambus Inc., www.rambus.com, DL0064–00.7, Aug. 1998, pp. 1–46.
Advanced Information, "Direct RMC.d1 Data Sheet", Rambus Inc., www.rambus.com, DL0036–00.7, Aug. 1998, pp. 1–104.

*Primary Examiner*—Thomas M. Heckler
*Attorney, Agent, or Firm*—Blakely, Sokoloff, Taylor & Zafman LLP

[57] ABSTRACT

An apparatus and method for transferring units of information between clock domains. A respective set of N units of information is loaded from an output circuit in a first clock domain into a storage circuit in a second clock domain during each cycle of the first clock domain. Each set of N units is selected by the output circuit to include (1) units of information that have previously been loaded into the storage circuit and that will not be output from the storage circuit prior to the storage circuit being loaded with a subsequent set of N units of information, and (2) a complement number of units of information that have not previously been loaded into the storage circuit.

12 Claims, 13 Drawing Sheets

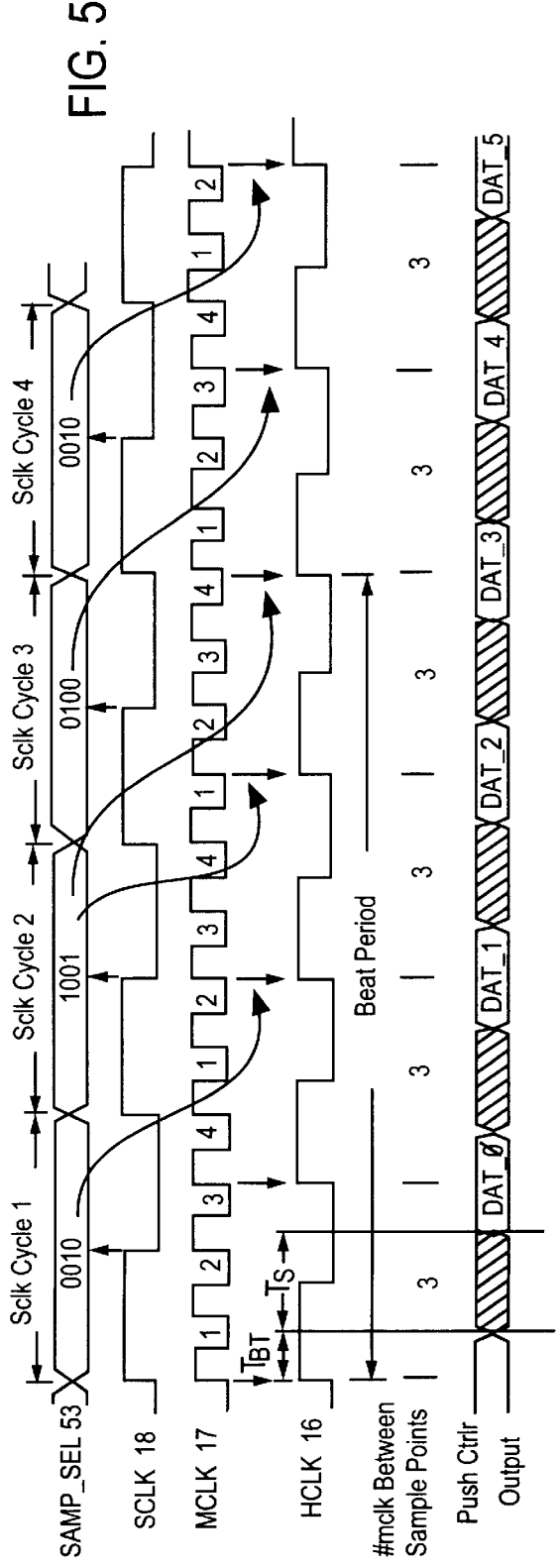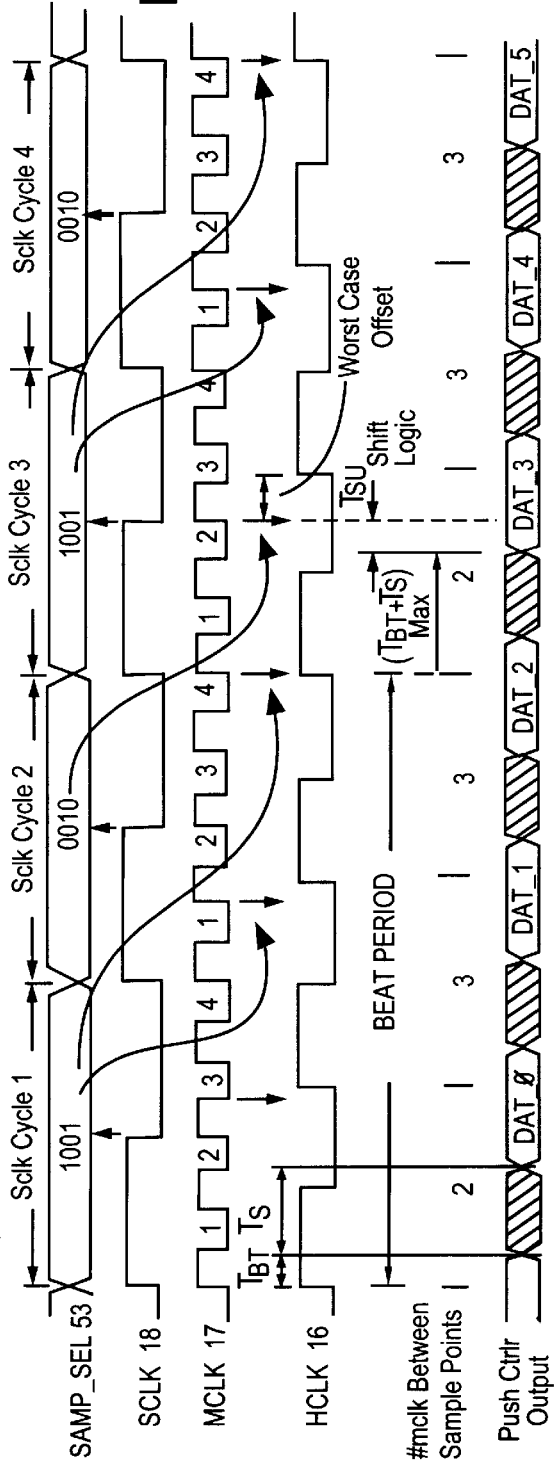

| nxt_ptr | Present lane_sel state | Condition |
|---|---|---|
| new_cnt MOD 4 | HOLD | new_cnt > 3 *pavail == '1' * bubble_width /=0 * new_cnt MOD 4 < bubble_width |
| new_cnt MOD 4 | PACKET | new_cnt > 3 * pavail == '1' |
| new_cnt MOD 4 - bubble_width | HOLD | new_cnt > 3 * pavail == '1' bubble_width /= 0 * ! (new_cnt MOD 4 < bubble_width) |
| new_cnt - bubble_width | BUBBLE | new_cnt > bubble_width |
| new_cnt | HOLD | ! (new_cnt > 3 ) |
| new_cnt | PACKET | ! (new_cnt > 3 ) * pavai == '1' |
| new_cnt | BUBBLE | ! (new_cnt > bubble_width) |
| lane_id | HOLD | new_cnt > 3 * pavail == '0' |
| lane_id | PACKET | pavail == '0' * (new_cnt > 3 + ( ! (new_cnt > 3 ) * new_cnt > lane_id))) |

CROSS-CLOCK DOMAIN DATA TRANSFER METHOD AND APPARATUS

FIELD OF THE INVENTION

The present invention relates to the field of data transfer, and more particularly to transferring information between circuits that are operated in different digital clock domains.

BACKGROUND OF THE INVENTION

In modern electronic devices, it is often necessary to transfer data between circuits in different digital clock domains. Although in many cases the clocks in the different domains are entirely unrelated, in some cases the clocks are generated from a common base clock or otherwise have a frequency relationship that may be used to time the transfer of information. For example, in at least one prior art memory system, a reference clock signal is used to generate both a memory clock 17 and a host clock 16. The memory clock 17 is used to time the transfer of data and commands to one or more memory devices via a high-speed, packet-oriented communication channel. The host clock 16 is used to manage memory access requests received from external agents and to format the requests into appropriate command and data packets for consumption in the memory clock 17 domain. To transfer a command or data packet to the memory clock 17 domain, control logic in the host clock 16 domain asserts the packet to logic in the memory clock 17 domain for as many cycles of the host clock 16 as required for the memory clock 17 domain to consume the packet.

One disadvantage of the above-described packet transfer technique is that, except for certain memory clock 17 to host clock 16 frequency ratios, the control logic in the host clock 16 domain will assert the packet to the memory clock 17 domain beyond the time necessary for the memory clock 17 domain to consume the packet. For example, suppose that the frequency between the memory clock 17 and the host clock 16 is such that the memory clock 17 domain can consume three-fourths of a packet during each cycle of the host clock 16. Because the memory clock 17 domain cannot consume an entire packet during a cycle of the host clock 16, the control logic in the host clock 16 domain outputs each packet for at least two cycle of the host clock 16, even though the memory clock 17 domain will consume the data in only one and one-third cycle of the host clock 16 (each quarter of the packet is consumed in a third of a cycle of the host clock 16). Consequently, each packet is asserted for two-thirds of a cycle of the host clock 16 longer than necessary, thereby reducing throughput and increasing response latency in the memory system.

SUMMARY OF THE INVENTION

A method and apparatus for transferring units of information between clock domains in a memory system are disclosed. A respective set of N units of information is loaded from an output circuit in a first clock domain to a storage circuit in a second clock domain during each clock cycle of the first clock domain. The output circuit selects each respective set of N units of information to include units of information that have previously been loaded into the storage circuit and that will not be output from the storage circuit prior to the storage circuit being loaded with a subsequent set of N units of information, and a complement number of units of information that have not previously been loaded into the storage circuit.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 5 is a timing diagram that illustrates use of a sample select signal to load data from a push controller into a shift logic circuit;

FIG. 6 is a timing diagram that illustrates use of a sample select signal to load data from a push controller into a shift logic circuit when there is a fractional number of memory clock cycles per host clock cycle;

FIG. 9 is a table that indicates the next value of the lane pointer for a given output lane;

DETAILED DESCRIPTION

Figure 1:
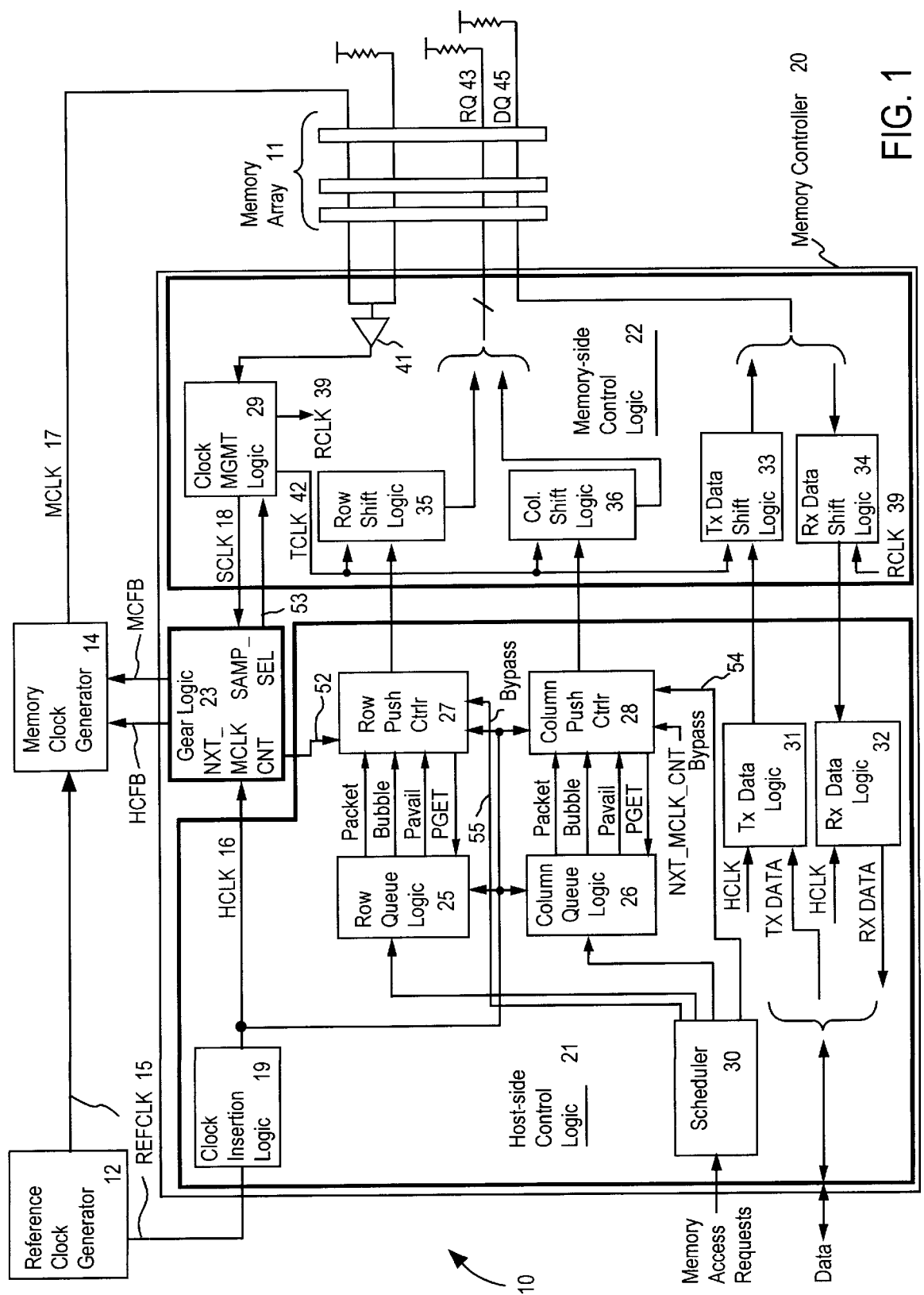
FIG. 1 illustrates a memory system according to one embodiment.

A memory controller that includes logic for efficiently transferring information between a host clock 16 domain and a memory clock 17 domain is disclosed. A scheduler 30 responds to memory access requests from external agents by formatting command packets and inserting the packets in packet queue 63s. Respective row push controller 27 accept the packets from the packet queue 63s and output the packets to a shift circuit in the memory clock 17 domain. The packets are shifted out of the shift circuit in fractional packet units referred to herein as "packet chunks." One packet chunk is shifted out of the shift circuit in the memory clock 17 domain per cycle of the memory clock 17. A packet chunk is said to be consumed by the memory clock 17 domain when it is shifted out of the shift circuit.

To avoid outputting packets to the memory clock 17 domain for longer than necessary, the row push controller 27 are designed to manage packet transfer based on packet chunks, instead of whole packets. By managing packet transfer based on packet chunks, it becomes possible to increase the packet throughput of the host clock 16 domain, because after an initial portion of a packet is consumed, only the unconsumed portion of the packet is output in the subsequent clock cycle and the remaining output paths of the row push controller 27 are used to output an initial portion of a subsequent packet. Because packets are transferred from the host clock 16 domain to the memory clock 17 domain with less delay, the overall response latency of the memory system may be reduced.

FIG. 1 illustrates a memory system 10 according to one embodiment. The memory system 10 includes a memory controller 20, a memory array 11, a reference clock generator 12 and a memory clock generator 14. The reference clock generator 12 outputs a reference clock 15 (REFCLK) to the memory controller 20 and to both the memory clock generator 14. The reference clock 15 may be divided to a reduced frequency before being supplied to the memory clock generator 14. The memory clock generator 14 generates a memory clock 17 (MCLK) from the reference clock 15 and outputs the memory clock 17 to the memory array 11 and to the memory controller 20.

The memory controller 20 includes host-side control logic 21, memory-side control logic 22 and gear logic 23. The host-side control logic 21 includes clock insertion logic 19 that generates a host clock 16 (HCLK) from the reference clock 15. In one embodiment, the clock insertion logic 19 includes a phase-locked loop circuit to advance the phase of the host clock 16 relative to the reference clock 15 to cancel delay caused by insertion of the reference clock 15 into the integrated circuit (IC) that contains the memory controller 20. The host clock 16 is used to clock logic units within the hostside control logic 21, and the memory clock 17 is used to clock logic units within the memory-side control logic 22 and also to clock transfers of command and data packets to the memory array 11.

The host side control logic 21 includes a scheduler 30 that receives requests to read and write the memory array 11 from external agents (e.g., processor, graphics subsystem, expansion bus master, and so forth). In one embodiment, the memory array 11 is a dynamic random access memory (DRAM) array in which packetized row commands are used to activate and precharge rows of memory cells and in which packetized column commands are used to read and write data in active rows. Consequently, the scheduler 30 responds to the memory access requests from the external agents by generating an appropriate sequence of packetized row and column commands to carry out the requested access operation. For example, if the scheduler 30 receives a request to access an inactive row in the memory array 11, the scheduler 30 will output a packetized row activate command to activate the row followed by a packetized column access command to access the row. The scheduler 30 may also output a packetized row precharge command to precharge the row after the column access is completed.

In some cases, the scheduler 30 may receive requests to access different rows within the same bank of the memory array 11. If the requests arrive near enough in time, they may conflict with one another, producing a resource conflict in the memory system 10. Other types of resource conflicts may also arise in memory system 10. When a resource conflict arises, it may be necessary to delay a memory access operation until a prior operation is completed or until the needed resource becomes available. In one embodiment, the scheduler 30 includes logic to determine, based on incoming requests, when resource conflicts may arise, and to take action to hold off memory operations by inserting a delay between command packets as necessary. This delay is referred to herein as a bubble. According to one embodiment, the scheduler 30 includes a value called a bubble vector with each command packet to indicate whether to delay the packet and, if delay is required, how long to delay the packet. The bubble vector is a value that indicates how many null packet chunks are to be inserted in the outgoing stream of chunks ahead of the packet (i.e., how many null chunks to prepend to the packet). In an alternate embodiment, the bubble vector could indicate how many null packet chunks should be appended to the rear of the packet. The bubble vector could also indicate both the number of null chunks to be prepended to the packet and the number of chunks to be appended to the packet. Bubble insertion is discussed in further detail below.

In addition to generating command packets and bubble vectors, in at least one embodiment, the scheduler 30 may also occasionally output a packet on a live bypass path 68 (not shown in FIG. 1). The scheduler indicates the presence of a packet on the live bypass path 68 by asserting a bypass signal 5554. Live bypass operations are discussed below in further detail.

The host-side control logic 21 includes row queue logic 25, row push controller 27, column queue logic 26 and column push controller 28. The scheduler 30 outputs row request command packets and associated bubble vectors to the row queue logic 25 which enqueues the row command packets and bubble vectors and outputs one row command packet and bubble vector at a time to the row push controller 27. The row queue logic 25 controller 27 outputs a packet-available signal 97 (PAVAIL) to the row push controller 27 to indicate the availability of valid packet, and the row push controller 27 outputs a packet-get signal 98 (PGET) signal to the row queue logic 25 to request a new packet from the queue. The row push controller 27 outputs the row command packets to row shift logic 35 in the memory-side control logic 22 which, in turn, shifts the command packets out to a high speed request channel 43 (RQ) for delivery to the memory array 11. The row queue logic 25, row push controller 27 and row shift logic 35 are referred to collectively herein as the row command logic.

The column queue logic 26, column push controller 28 and column shift logic 36 collectively form column command logic that operates similarly to the row command logic, except that the column command logic is used to deliver column command packets to the memory array 11. Also, the transmit data logic 31 and transmit data shift logic 33 collectively form data store logic that may be operated similarly to the row and column command logic, except that the data store logic is used to deliver write data packets to the memory array 11 via a high speed data channel 45 (DQ). The receive data logic 32 and receive data shift logic 34 collectively form data retrieve logic that operates in an inverse fashion to the data store logic to retrieve data packets from the memory array 11 via the DQ channel 45 and to format the data packets for transfer to the requesting units via a data bus (DATA).

The memory controller also includes gear logic 23 which generates a number of signals based on the frequency ratio of the host clock 16 to the memory clock 17. The signals generated by the gear logic 23 include a pair of clock feedback signals (HCFB, MCFB), a next memory clock count 52 (NXT_MCLK_CNT) and a sample select signal 53 (SAMP_SEL). In one embodiment, the ratio of the host clock 16 frequency to the memory clock 17 frequency (referred to as a "gear ratio") is indicated by hardwired signals set within or supplied to the memory controller 20. The gear logic 23 receives the host clock 16 and a subdivided version of the memory clock 17, referred to herein as sample clock 18 (SCLK), and subdivides the host clock 16 and sample clock 18 to a common frequency to generate the pair of clock feedback signals HCFB and MCFB. No subdivision is necessary if the host clock 16 and sample clock 18 are already at the same frequency. The clock feedback signals are output to the memory clock generator 14 which adjusts the phase of the memory clock 17 according to the phase difference between the clock feedback signals to control the phase relationship between the host clock 16 and the memory clock 17.

The gear logic 23 updates the next memory clock count 52 during each cycle of the host clock 16 based on the frequency ratio between the host clock 16 and the memory clock 17. As discussed below, the next memory clock count 52 is a count value that indicates the number of packet chunks that will be shifted out of the shift logic circuits 35, 36 in the memory-side control logic 22 during the next cycle of the host clock 16. In one embodiment, the next memory clock count 52 is supplied to the row push controller 27 and the column push controller 28. In an alternate embodiment, the next memory clock count 52 may additionally be provided to the transmit data logic 31 and the receive data logic 32.

The sample select signal 53 is output from the gear logic 23 to clock management logic 29 in the memory-side control logic 22. The sample select signal 53 is sampled by the memory-side control logic 22 during each cycle of the sample clock 18 and is used to determine which cycles of the memory clock 17 in the subsequent sample clock 18 cycle are to be used to load data from the row push controller 27 to the shift logic circuits 35, 36. The clock management logic 29 receives the memory clock 17 from a buffer amplifier 41 and subdivides the memory clock 17 by four to generate the sample clock 18. Other subdividing values may be used in alternate embodiments. The clock management logic 29 also outputs a transmit clock 42 (TCLK) and a receive clock (RCLK). These clocks are operated at the memory clock frequency, but have a slightly different phase than the memory clock 17.

Figure 2:
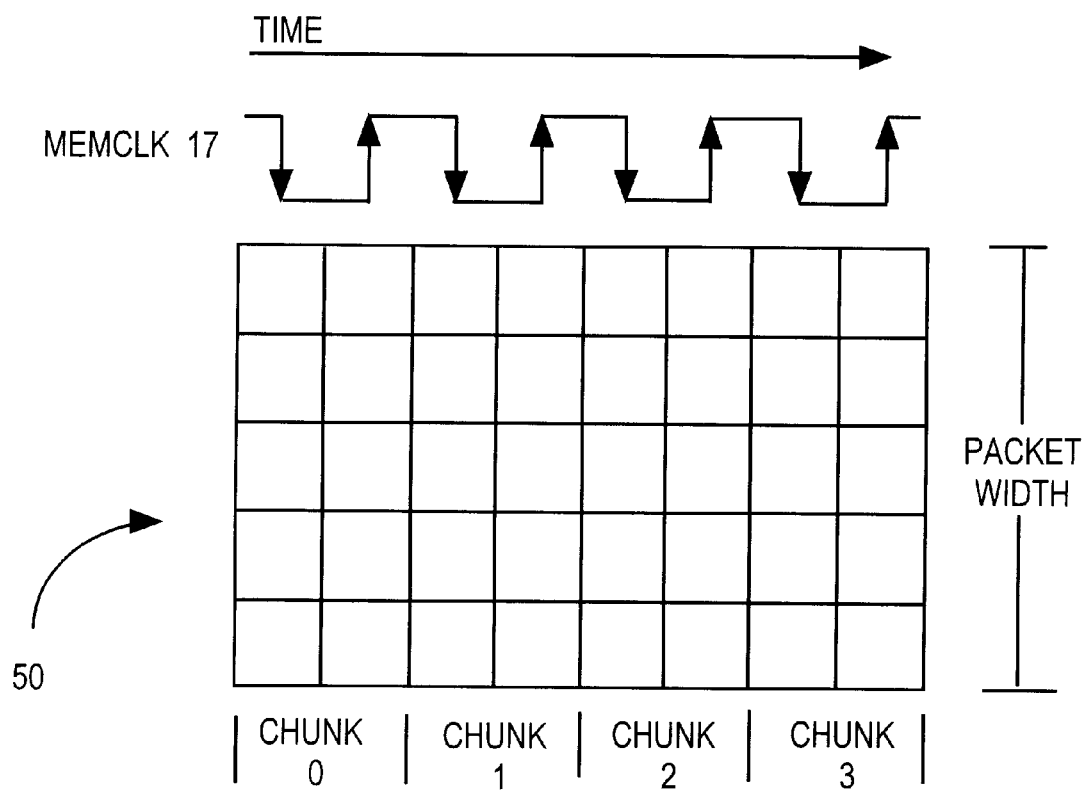
FIG. 2 illustrates an exemplary column command packet.

FIG. 2 illustrates an exemplary column command packet 50. In one embodiment, the width of the column command packet is fixed at a predetermined number of bits according to the number of conductors allotted in the channel 43 to transmit the packet to the memory array 11. The length of the packet is also fixed at a predetermined number of bits to allow the packet to be output to the memory array 11 in a predetermined number of cycles of the memory clock 17. In the exemplary column command packet 50, for example, five bits are transferred during each falling edge and each rising edge of the memory clock 17. By constraining column command packets to have a fixed length of eight bits, any column command packet can be shifted from the column shift logic 36 to the appropriate conductors of channel 43 in four cycles of the memory clock.

In one embodiment, row command packets and data packets each have the same packet length as the column command packet, but different packet widths. In discussions which follow, packet lengths are assumed to be fixed at eight bits so that a packet is consumed by the memory-side control logic 22 in four memory clock cycles. However, other packet dimensions may be used in alternate embodiments, including time-varying packet dimensions, without departing from the scope of the present invention.

Each pair of bit columns in packet 50 constitute a unit of information referred to herein as a packet chunk. Generally, a packet chunk is the amount of information that is consumed by the memory-side control logic 22 in a single cycle of the memory clock 17. As mentioned above, the memory-side control logic 22 consumes a packet chunk each time it shifts a chunk out of a shift logic circuit 35, 36. The number of bits in a packet chunk depends upon the width of the packet and the number of shift operations per memory clock 17 cycle. In the packet of FIG. 2, the packet is five bits wide and separate sets of five bits are shifted out to the channel 43 during each falling edge and each rising edge of the memory clock 17. Therefore, the column command packet 50 includes four chunks of ten bits each. As discussed above, row command packets and data packets may have different widths, and alternate packet dimensions (including time varying dimensions) may be used in other embodiments.

Figure 3:
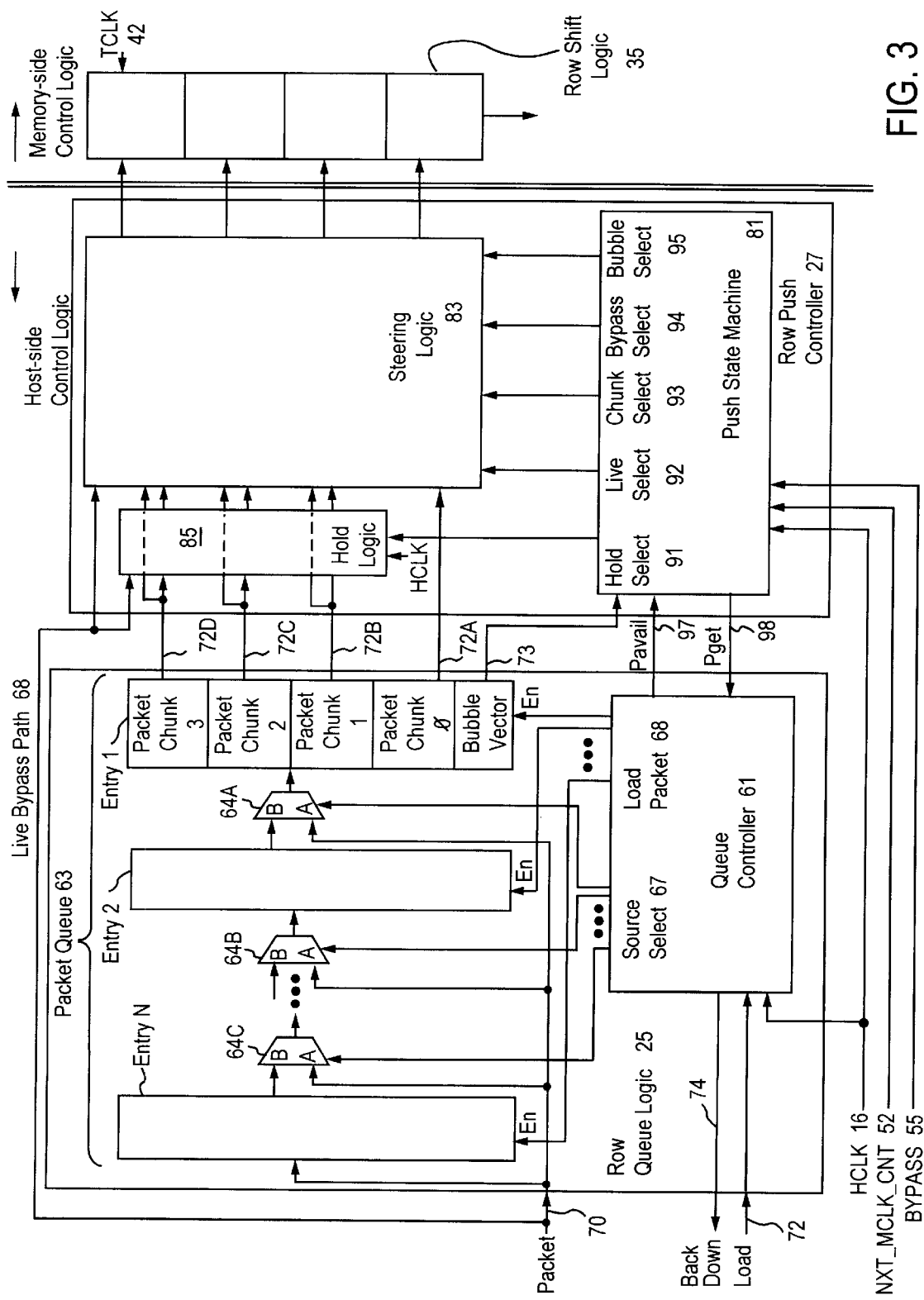
FIG. 3 illustrates the row command logic of FIG. 1 according to one embodiment.

FIG. 3 illustrates the row command logic of FIG. 1 according to one embodiment. The column command logic is implemented in an analogous manner and will not be separately described. A similar structure may also be used to transfer data between the host clock and memory clock domains.

The row queue logic 25 includes a packet queue 63 and a queue controller 61. The packet queue 63 includes entries 1 to N, each capable of holding a complete packet and an associated bubble vector. The arrangement of packet chunks and the bubble vector in an entry of the packet queue is illustrated by Entry 1. In one embodiment, each entry in the packet queue 63 includes an enable input (EN) that is strobed to load a packet. Multiplexers 64A–64C are used to select either the preceding entry in the packet queue 63 or the input packet path 70 to be the source of the loaded packet. The final entry in the packet queue, i.e., EntryN, is coupled directly to the input packet path 70.

When a packet to be queued in the row queue logic 25 is present on the input packet path 70, the scheduler 30 (see FIG. 1) outputs a load signal 72 to the queue controller 61. The queue controller 61 responds by asserting an appropriate source select signal 67 and load packet signal 68 to cause the packet to be loaded from the input packet path 70 into the lowest numbered available entry in the packet queue 63, called the tail of the packet queue 63. If there are no available packet queue 63 entries (i.e., the packet queue 63 is full), the queue controller 61 issues a back down signal 74 to the scheduler 30 to cause the scheduler 30 to retry the load operation in a subsequent host clock cycle.

The lowest numbered entry in the packet queue 63 is referred to as the head of the queue. A packet and bubble vector at the head of the packet queue 63 are output to the row push controller 27 and are referred to herein as being "live". The queue controller 61 outputs a packet-available signal 97 (PAVAIL) to indicate presence of a valid packet and bubble vector at the head of the packet queue 63. When the row push controller 27 is ready for a new live packet and bubble vector, the row push controller 27 asserts a packet-get signal 98 (PGET) to the queue controller 61 to cause the queue controller 61 to advance the entries in the packet queue 63 so that the next packet in sequence is output at the head of the packet queue 63. The queue controller 61 responds to the packet-get signal 98 by asserting respective source select signals and load packet signals to cause the contents of the packet queue 63 to be shifted by one entry toward the head of the packet queue 63. The value previously at the head of the packet queue 63 is overwritten and is said to be popped of the packet queue 63.

In one embodiment, the queue controller 61 is implemented by a state machine that is clocked by the host clock 16 and that maintains a tail pointer to track the tail of the packet queue 63. The tail pointer is decremented each time a packet is popped off the head of the packet queue 63 in response to a packet-get signal 98, and the tail pointer is incremented each time a packet is loaded into the packet queue 63 in response to a load signal 72. If the tail pointer points to the head of the packet queue 63, then the packet queue 63 is empty and the packet-available signal 97 is deasserted. If the tail pointer does not point to the head of the packet queue 63, then the packet-available signal 97 is asserted to indicate that a live packet and bubble are present at the head of the packet queue 63.

In one embodiment, the row push controller 27 includes hold logic 85, steering logic 83 and a push state machine 81. The hold logic 85 is used to store chunks of partially consumed packets and thereby allows a new packet to be advanced to the head of the packet queue 63, while preserving the yet unconsumed chunks of the previous packet. In one embodiment, the hold logic 85 receives the output of the packet queue 63 via chunk lines 72B, 72C and 72D. The hold logic 85 is also coupled to at least a portion of the live bypass path 68 and, in certain circumstances, is used to store one or more chunks delivered via the live bypass path 68. A hold select signal 91 from the push state machine 81 is used to determine the source of chunks stored in the hold logic 85 during a each cycle of the host clock 16.

The steering logic 83 receives each of the constituent chunks of a live packet directly from the head of the packet queue 63 via paths 72A–72D (indicated by the dashed-line paths crossing the hold logic 85 in FIG. 3), as well as any packet chunks stored in storage elements within the hold logic 85. The steering logic 83 is also coupled to receive packet chunks from the live bypass path 68 when a live bypass operation occurs. Based on select signals from the push state machine 81, including a live select signal 92, chunk select signal 93, bypass select signal 94 and bubble select signal 95, the steering logic 83 selects four packet chunks to be output to the row shift logic 35. The selected packet chunks may include null chunks.

The push state machine 81 receives the packet-available signal 97 from the queue controller 61, the next memory clock count 52 from the gear logic 23 (shown in FIG. 1) and the bypass signal 55 from the scheduler 30 (also shown in FIG. 1). In response to these input signals, the host clock 16, and the current state of the push state machine 81, the push state machine 81 generates the above-mentioned select signals and the packet-get signal 98. The logic used to generate the select signals and the packet get signal 98 is discussed below.

Figure 4:
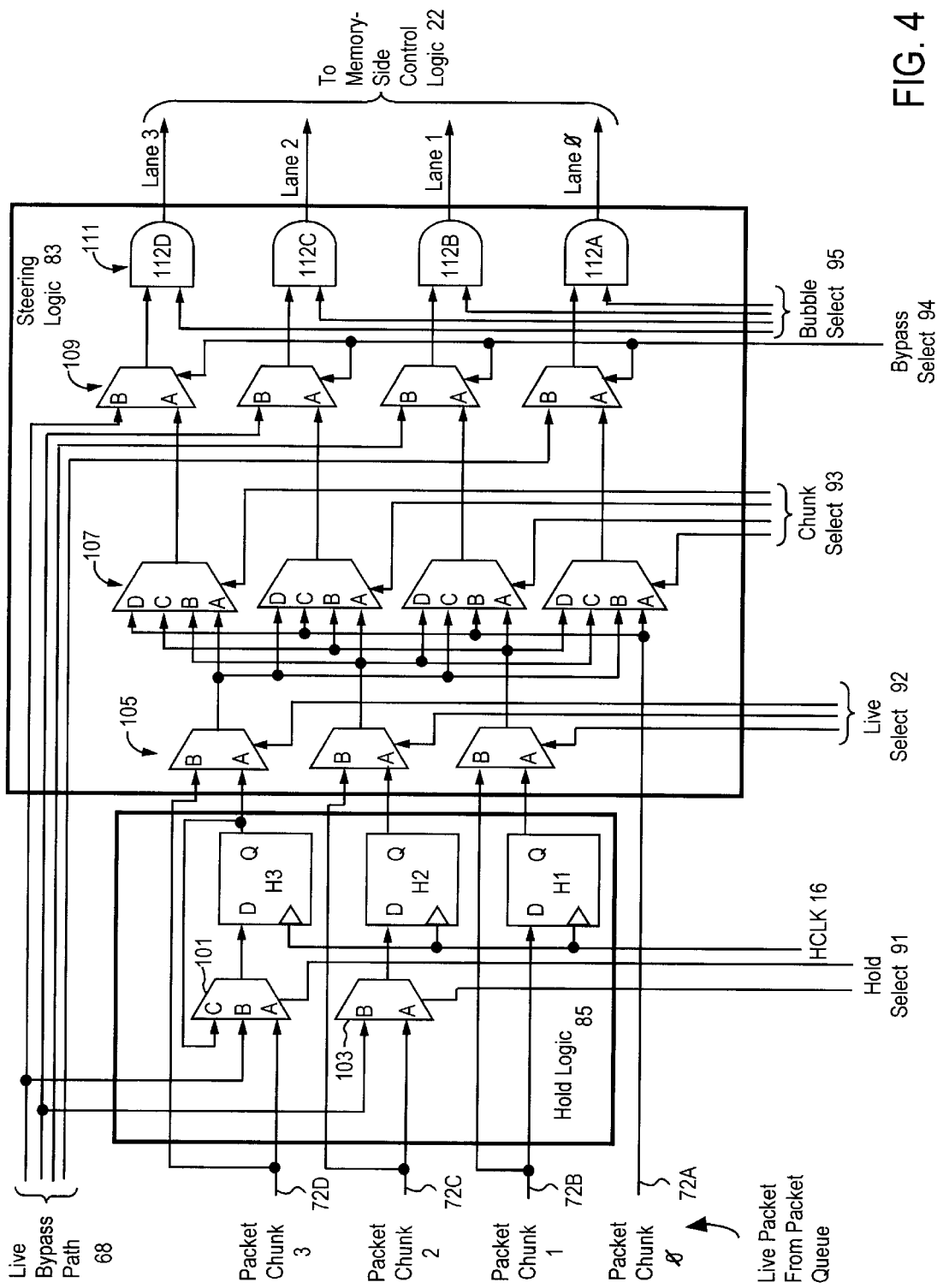
FIG. 4 illustrates the hold logic and the steering logic of the row push controller of FIG. 3 according to one embodiment.

FIG. 4 illustrates the hold logic 85 and the steering logic 83 of the row push controller 27 of FIG. 3 in greater detail. In one embodiment, the hold logic 85 includes three storage elements H1–H3 and a pair of multiplexers 101, 103. The purpose of the storage elements H1–H3 is to hold chunks of a partially consumed packet so that a new packet may be advanced to the head of the packet queue 63 without losing the unconsumed chunks of the current live packet. This arrangement allows chunks from two different packets to be output to the memory-side control logic during a single host-clock cycle.

As a matter of terminology, a partially consumed packet is a packet from which at least one chunk (e.g., chunk0) has been loaded into and shifted out of a shift logic circuit in the memory-side control logic 22 (i.e., at least one chunk has been consumed). According to one embodiment, the push state machine 81 does not assert the packet-get signal 98 to advance a new packet to the head of the packet queue 63 (i.e., get a new live packet) until at least one chunk of the current live packet is consumed by the memory-side control logic 22. Because packet chunks are consumed in order starting with Chunk0, it follows that a packet will not be popped off the head of the packet queue until at least Chunk0 is consumed. Consequently, it is unnecessary to provide a storage element to store Chunk0, because if Chunk0 of a packet has not been consumed, the packet will remain live and Chunk0 will be available at the head of the packet queue 63.

The multiplexers 101, 103 are provided because, at least for storage elements H2 and H3, there is more than one possible source of the packet chunk to be stored. For example, in the case of storage element H2, Chunk2 may be provided on the live bypass path 68 or from the packet queue 63. Thus, a two-input multiplexer 103 is provided to select Chunk2 from one of these two sources during each cycle of the host clock 16. In the case of storage element H3, Chunk3 may be obtained from the live bypass path 68, from the packet queue 63, or from the storage element H3 itself. The three-input multiplexer 101 is provided to select between these different chunk sources. Both multiplexers 101, 103 are controlled by a hold select signal 91 output from the push state machine 81. The logic used to generate the hold select signal 91 is discussed below.

When a chunk is provided to the storage element H3 from the H3 storage element itself, the chunk is said to be recirculated in the H3 storage element. Recirculation of a chunk in a storage element may be required whenever more than one cycle of the host clock 16 is needed to complete consumption of a partially consumed packet. That is, recirculation occurs when consumption of a packet spans three or more cycles of the host clock 16 (e.g., chunk0 consumed in a first clock cycle, chunk1 and chunk2 consumed in a second clock cycle, and chunk3 consumed in a third clock cycle). In one embodiment, the permitted range of host clock 16 to memory clock 17 frequency ratios is restricted to ratios in which at least two packet chunks are consumed in the memory clock domain per cycle of the host clock 16. Consequently, once a packet is minimally consumed (i.e., Chunk0 consumed), at least chunk1 and chunk2 will be consumed during the subsequent cycle of the host clock 16. Therefore only Chunk3 will need to be recirculated, and then only for certain host clock 16 to memory clock 17 frequency ratios. In alternate embodiments in which a wider range of host clock 16 to memory clock 17 frequency ratios are permitted or in which larger packet sizes are used, recirculation of other packet chunks may be necessary and also it may be necessary to recirculate a given chunk multiple times.

The output paths from the steering logic 83 to the memory-side control logic are referred to herein as output lanes. In one embodiment, the steering includes four output lanes, Lane0–Lane3, to allow a complement of packet chunks to be output during each cycle of the host clock 16. Because chunks supplied to the memory-side control logic via Lane0 will be consumed before chunks supplied via Lane1 (and so forth to Lane3), the output lanes are effectively prioritized, with Lane0 having the highest priority and Lane3 having the lowest priority.

The steering logic 83 also includes three stages of multiplexers and a bubble insertion stage that effectively form lane pointers to select a respective chunk source for each output lane according to the select signals from the push state machine. During each cycle of the host clock 16, the multiplexer stages select one each of Chunk0, Chunk1, Chunk2 and Chunk3 from either one or two packets and steer the chunks to appropriate output lanes. If chunks from two different packets are to be output, then one or more chunks will be obtained from a live packet and the remaining chunks will be obtained from the hold logic. Chunks from the hold logic are from a partially consumed packet and therefore need to be consumed by the memory-side control logic before the chunks from the live packet. Therefore, the one or more chunks from the hold logic are steered to higher priority output lanes than the chunks from the live packet. If chunks from a single packet are to be output, then the chunks will be obtained from either a live packet or the live bypass path. In either case, all four chunks are steered straight through to the output lanes so that Chunk0 is output on Lane0, Chunk1 is output on Lane1 and so forth.

The first stage of multiplexers 105 is used to select either the packet queue 63 (i.e., live data) or the hold logic 85 to be the chunk source for packet chunks Chunk1, Chunk2 and Chunk3. The live select signal 92 from the push state machine 81 determines this selection. In one embodiment, the live select signal 92 is a vector that includes three different values that provide independent control of each of the first stage multiplexers 105.

The second stage of multiplexers 107 is used to rotate the four packet chunks in cases where at least one packet chunk is obtained from the hold logic 85. As discussed above, chunks from the hold logic are rotated to the higher priority output lanes so that they are consumed before the chunks of a live packet.

The third stage of multiplexers 109 is controlled by a bypass select signal 94 to select either the second stage multiplexers 107 or the live bypass path 68 as the chunk source of the output lanes. In one embodiment, live bypass occurs after the packet queue 63 has been emptied and all the packets have been consumed by the memory-side control logic 22. To live bypass path 68 is provided to deliver a packet directly to the third stage multiplexers 109 and thereby avoid the delay that results from propagation of the packet through the packet queue and through the first two multiplexer stages of the steering logic 83. In this way, the row push controller 27 is rapidly primed with a new packet for output to the memory-side control logic 22. Subsequent packets may then be enqueued in the packet queue 63 and propagated through the steering logic 83 while the live bypass packet is being consumed by the memory-side control logic.

The bubble insertion stage 111 is used to insert null chunks in the sequence of chunks consumed by the memory-side control logic 22. In one embodiment, zero to three null chunks are inserted between packets according to the operating constraints of the memory array and the memory-side control logic 22. Because null chunks are consumed by the memory-side control logic like packet chunks, each null chunk is used to inject a delay equal to the period of the memory clock 17. Thus, null chunks serve as placeholders to enforce time delays between successive packet transfers. Null chunks are also output to the memory-side control logic 22 when no packets are forthcoming from the scheduler 30 and the packet queue 63 has been emptied. As a matter of terminology, a chunk from a command packet, a chunk from a data packet and a null chunk are all considered to be units of information that are supplied to the memory-side control logic 22.

In one embodiment, the bubble insertion stage 111 includes four AND logic elements 112A–112D, each of which is independently controlled by a bubble select signal 95 to null the chunk supplied to the corresponding output lane. When a line of the bubble select signal 95 is held high, for example at AND logic element 112A, then the output of the corresponding stage three multiplexer is passed through the AND logic element 112A to the output lane. When the same line of the bubble select signal 95 is driven low at the AND logic element 112A, the chunk output at Lane0 is forced low (i.e., nulled). The other output lanes can similarly be nulled. Other structures for outputting null data on the output lanes may be used in alternate embodiments. Also, in an alternate embodiment, the bubble insertion stage 111 may be positioned elsewhere in the sequence of stages, for example, between the second stage multiplexers 107 and the third stage multiplexers 109.

Reflecting briefly on the operation of the push controller 27 note that, even though a fixed number of packet chunks are loaded into the shift logic of the memory-side control logic during each host clock cycle, not all of the packet chunks will be shifted out of the shift circuit (i.e., consumed) before the load operation takes place for the next host clock cycle (at least for certain host clock to memory clock frequency ratios). In effect, the push controller 27 tracks the state of the packet chunks in the shift circuit and steers copies of the unconsumed chunks to the appropriate output lanes so that, when the subsequent load operation takes place, any unconsumed chunks in the shift logic are overwritten with duplicate values. Consequently, new chunks are loaded into vacant entries of the shift circuit, while unconsumed chunks in the shift circuit are unaffected. In this way, a full complement of packet chunks is output from the push controller and loaded into the shift circuit during each cycle of the host clock, but only the vacant entries of the shift logic are updated with new chunks.

Having described the hold logic 85 and the steering logic 83, in bears emphasis that many of the signal paths in the hold logic 85 and the steering logic 83 are multiple conductor paths, with the total number of conductors being determined by the number of bits per chunk. For example, a packet having ten bits per chunk would require ten conductors per chunk path through the hold logic 85 and the steering logic 83. The storage elements H1–H3 in the hold logic 85 would each be required to store a bank of ten bits, and the AND logic elements 112A–112D in the bubble insertion stage of the steering logic 83 would each need to be able to null ten bits of data. Signal paths having more or fewer conductors may be used for packets having more or fewer bits per chunk.

FIG. 5 illustrates the manner in which the sample select signal 53 (SAMP_SEL) is used to load data from a push controller into a corresponding shift logic circuit in the memory-side control logic. In the example shown, the ratio of the host clock 16 (HCLK) to the sample clock 18 (SCLK) is 4:3. In one embodiment, the sample clock 18 is generated by dividing the memory clock 17 (MCLK) by four so that there are four cycles of the memory clock 17 for each cycle of the sample clock 18 and three cycles of the memory clock 17 for each cycle of the host clock 16. Because of the 4:3 ratio of the host clock 16 to the sample clock 18, rising edges of the host clock 16 and sample clock 18 are aligned on a beat frequency that is one-fourth the host clock 16 frequency and one-third the sample clock 18 frequency.

In one embodiment, the sample select signal 53 is sampled by the clock management logic (element 29 of FIG. 1) in the memory clock 17 domain in response to each falling edge of the sample clock 18. These sample points are indicated in FIG. 5 by the arrows above the falling edges of the sample clock 18. The sample select signal 53 is a vector in which each bit corresponds to a respective memory cycle in the subsequent cycle of the sample clock 18 and indicates whether or not to load the output of the push controller into the corresponding shift logic circuit during that memory cycle.

The push controller output begins to transition in response to each rising edge of the host clock 16. Because a relatively constant time passes before the push controller output begins to change, and because it takes a relatively constant time Ts for the push controller output to settle, the push controller output remains valid for a time before and after each subsequent rising edge of the host clock 16. This is illustrated in FIG. 5 by the Dat_0-Dat_5 data valid windows. Thus, by causing the memory-side control logic to sample the push controller output in response to a rising edge of the memory clock 17 that coincides with the rising edge of the host clock 16, a valid set of chunks from the push controller will be loaded into the corresponding shift logic circuit of the memory-side control logic during each cycle of the host clock 16. Therefore, the sample select signal 53 output to the memory-side control logic during each cycle of the sample clock 18 is assigned a value that indicates which of the four memory cycles in the subsequent sample clock period will coincide or most nearly coincide with a rising edge of the host clock 16 signal. For example, the second of four memory cycles is aligned with a rising edge of the host clock 16 in the second cycle of the sample clock 18. Consequently, the sample select signal 53 output during the first sample clock 18 signal has a value of 0010 (in this notation, the rightmost digit corresponds to the first memory clock 17 cycle of the sample clock 18 period). During the third cycle of the sample clock 18, the first and fourth cycles of the memory clock 17 are aligned with rising edges of the host clock 16. Consequently, the sample select signal 53 output during the second sample clock 18 signal has a value of 1001, indicating that the shift logic circuit should be loaded twice during the third cycle of the sample clock 18. During the fourth cycle of the sample clock 18, the third memory clock 17 cycle is aligned with a rising edge of the host clock 16. Consequently, the sample select signal 53 output during the third sample clock 18 signal has a value of 0100. Because the phase relationship between the host clock 16 and the sample clock 18 repeats every three cycles of the sample clock 18, the sample select signal 53 will be output in a repeating pattern of 0010, 1001, 0100.

FIG. 6 is a timing diagram that illustrates the values of the sample select signal 53 for a 3:2 frequency ratio between the host clock 16 and the sample clock 18. In this timing arrangement, number of cycles of the memory clock 17 per cycle of the host clock 16 is a fractional value, so that, except for at the beat period (every third cycle of the host clock 16), the memory clock 17 does not exactly coincide with a rising edge of the host clock 16. In one embodiment, this circumstance is managed by extending the time during which the push controller output is valid in order to allow for sampling on cycles of the memory clock 17 that somewhat precede the rising edge of the host clock 16. The valid push controller output is extended, in one implementation, by shortening the time required for the push controller output to begin transitioning, $T_{BT}$, or by shortening the time required for the push controller output to settle, $T_S$, or by shortening both $T_{BT}$ and $T_S$. As shown in FIG. 6, the worst case offset between a sampling edge of the memory clock 17 and a rising edge of the host clock 16 occurs during the third cycle of the sample clock 18. At that point the sampling edge of the memory clock 17 leads the host clock by two-thirds of a memory clock cycle. As illustrated in FIG. 6, this worst-case sampling point and the setup time $T_{SU}$ of the shift logic in the memory-side control logic (i.e., the time for which the push controller output must be valid before it can be loaded into the shift logic) determine the maximum of the sum of $T_{BT}$ and $T_S$.

Another interesting consequence of the fractional ratio between the frequencies of the memory clock 17 and the host clock 16 is that a varying number of cycles of the memory clock 17 occur between sample points. Consequently, the number of packet chunks consumed by the memory-side control logic per cycle of the host clock 16 varies in a repeating pattern of 2, 3, 3, 2, 3, 3. This is the pattern of the next memory clock count 52 signal output by the gear logic 23. By contrast, the next memory clock count 52 output in the 4:3 clock ratio of FIG. 5 remains constant at three.

Still referring to FIG. 6, the sample select output during the first cycle of the sample clock 18 is 1001, indicating that the push controller output is to be sampled twice during the second cycle of the sample clock 18 (at memory clock cycles one and four). The sample select output during the second cycle of the sample clock 18 is 0010, indicating that the push controller output is to be sampled once during the third cycle of the sample clock 18 (at memory clock cycle two). Because the phase relationship between the host clock 16 and the sample clock 18 repeats every two cycles of the sample clock 18, sample select signal 53 will be output in a repeating pattern of 1001, 0010.

Figure 7:
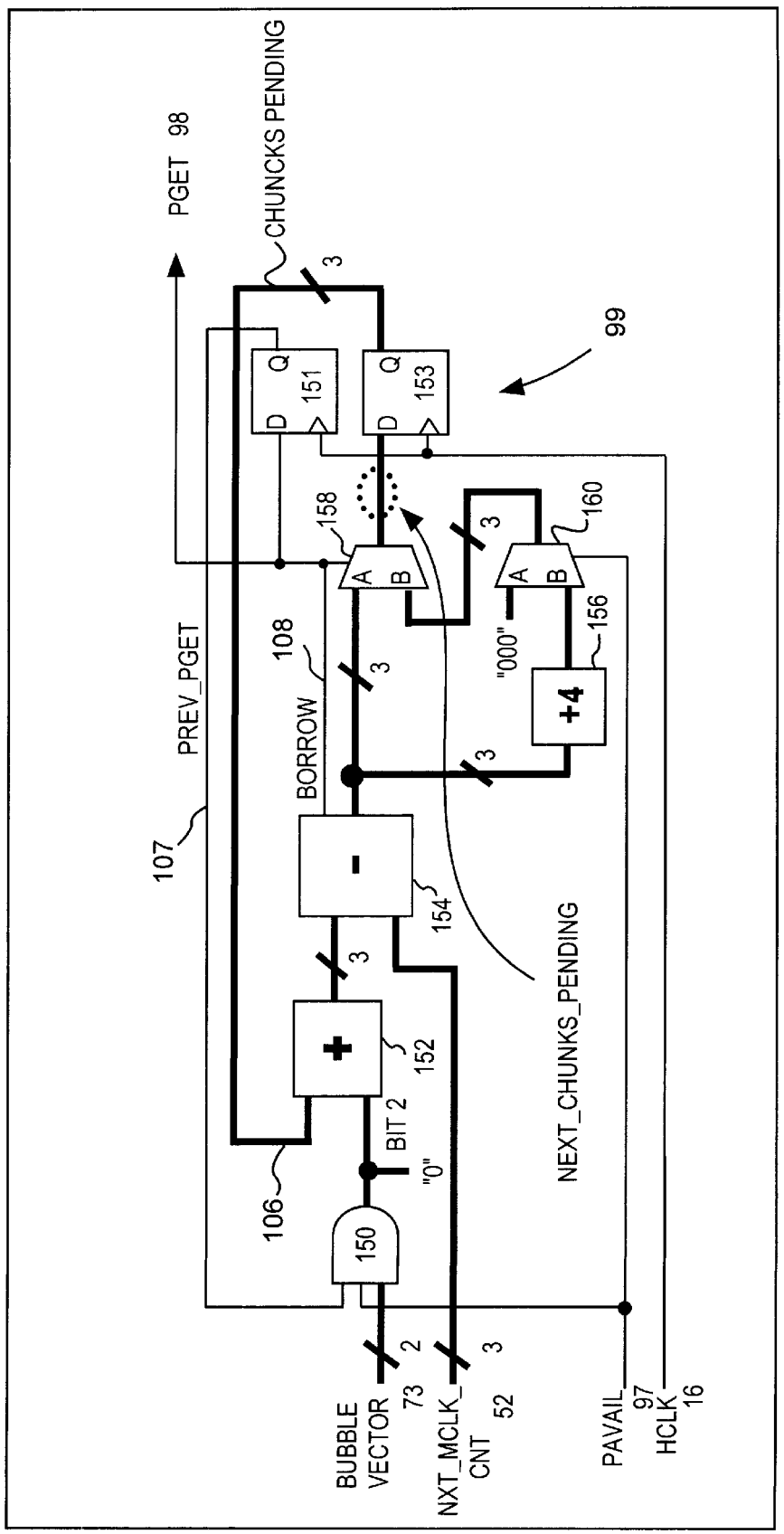
FIG. 7 illustrates pget logic within the push controller according to one embodiment.

FIG. 7 illustrates pget logic 99 within the push controller according to one embodiment. During each cycle of the host clock, the pget logic 99 determines the number of chunks that will be consumed by the memory-side control logic and the number of chunks pending in the push controller and determines whether the push controller will need a new live packet during the subsequent cycle of the host clock. If so, the packet-get signal 98 is asserted, otherwise the packet-get signal 98 is deasserted.

The pget logic includes two state elements that are each updated once per cycle of the host clock: a chunk pending register 153 and a previous pget register 151. The chunk pending register 153 indicates the number of chunks of packet data and bubbles that the push controller is processing in the current host clock. The previous pget register asserts a signal 107 indicating the state of the packet-get signal 98 during the previous cycle. If the previous pget register 151 indicates that the packet-get signal was asserted during the previous cycle and if the packet-available signal 97 is currently asserted, then the value of the live bubble vector 73 (i.e., from the packet queue) is combined with a chunks pending signal 106 from the chunk pending register 153 using adder 152. The next memory clock count 52 is then subtracted from the output of the adder 152 in subtracter 154. If the subtraction result is negative, a borrow signal 108 is asserted, indicating that there are not enough chunks pending (including null chunks indicated by the bubble vector) to supply the number of chunks that will be consumed in the next cycle of the host clock 16. In that event, the packet-get signal 98 is asserted. In the embodiment depicted in FIG. 7, the borrow signal 108 is the packet-get signal. In alternate embodiments, additonal logic may be interposed between the borrow signal 108 and the packet-get signal 98 (e.g., logic to force packet-get high in certain instances). When the borrow signal is asserted, path B in multiplexer 158 is selected to provide the next chunks pending value. If the packet-available signal 97 is asserted, then the next chunks pending value will be the output of the subtractor 154 plus the number of chunks per packet (e.g., four—contributed by adder 156), supplied via path B of multiplexer 160. If the packet-available signal is not asserted, then the chunks pending count is forced to zero through path A of the multiplexer 160. In one embodiment, the chunks pending signal is used by gate the bypass select signal (e.g., signal 94 in FIG. 4) so that live bypass is only permitted if there are no chunks pending in the push controller.

Figure 8:
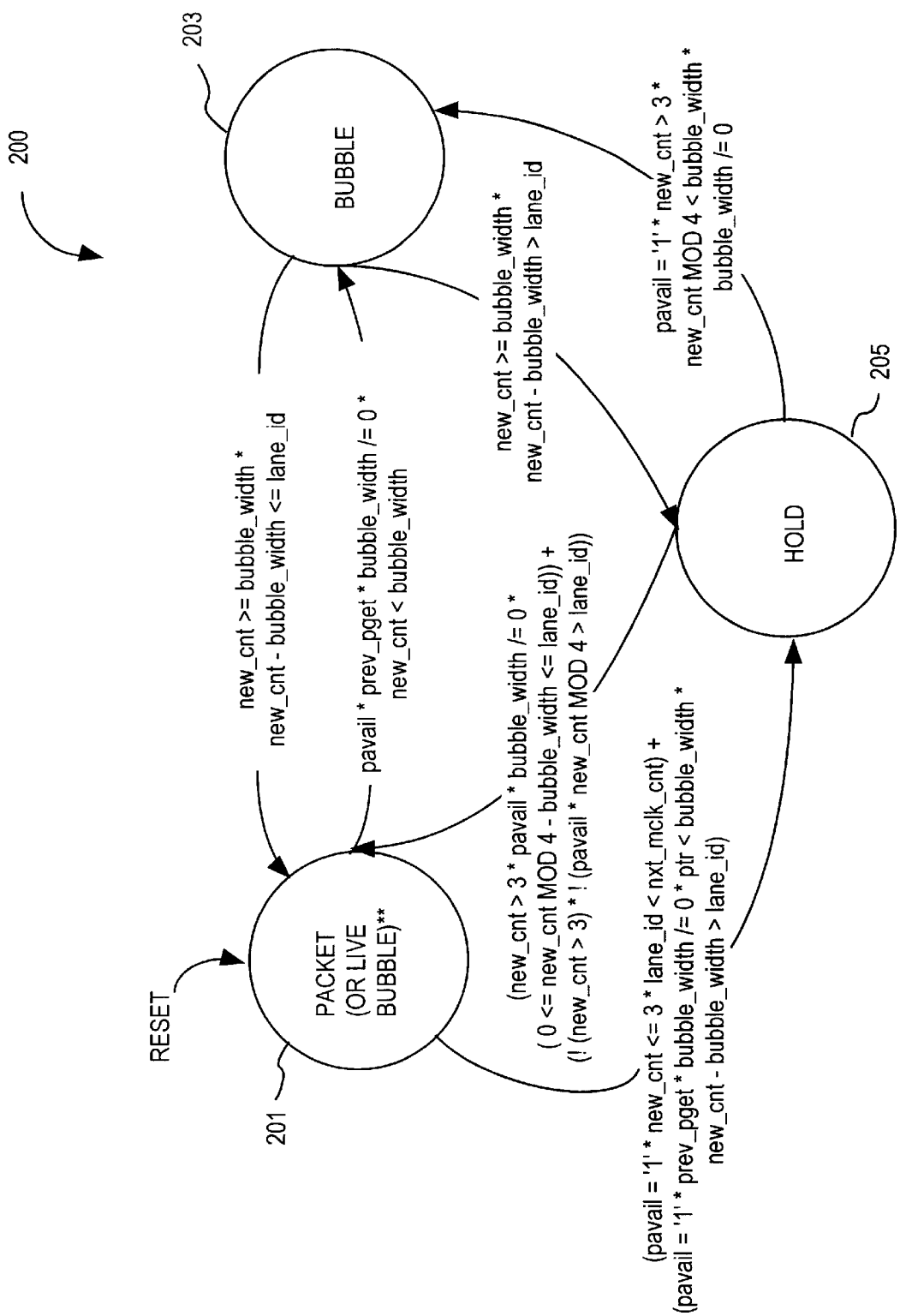
FIG. 8 is a diagram of a lane select state machine for generating the bubble select and live select signals according to one embodiment.

FIG. 8 is a diagram of a lane select state machine 200 for generating the bubble select and live select signals according to one embodiment. The lane select state machine 200 is included within the push state machine and transitions from between states in response to transitions of the host clock. In one embodiment, a separate lane select state machine 200 is provided for each output lane of the push controller.

The lane select state machine can enter one of three states, Packet 201, Bubble 203 and Hold 205, and is initially reset to the Hold state 205. From a given state, Packet, Bubble or Hold, the lane select state machine can enter either of the other two states or remain in the same state. Generally, the bubble select signal and the live select signal for a given output lane are asserted according to the lane select state for that lane. If the lane select state is the Bubble state 203, the bubble select signal for the lane is asserted. If the lane select state is the Hold state 205, the live select signal for the lane is deasserted to select an output from the hold logic 85. If the lane select state is in the Packet state 201, the live select signal for the output lane is asserted to select an output from the live packet at the head of the packet queue, with one exception; if, while in the Packet state, the packet-available signal is true, the packet-get signal was asserted during the previous cycle of the host clock, the bubble width is non-zero, and the lane pointer is less than the bubble width, then the bubble select signal is asserted. The logical conditions for transitioning between the three states are shown in FIG. 8. The lane select state machine remains in the same state if neither of the conditions for transitioning to the other two states is satsified. As discussed above, the new count (NEW_CNT) refers to the sum of the value of the lane pointer (0–3) for the output lane plus the next memory clock count. In the notation of FIG. 8, the expression "bubble_width/=0" refers to a nonzero bubble vector; the term MOD refers to the modulus operator (i.e., remainder of integer division); the expression "pavail='1'" refers to an asserted packet-available signal; the '*' character indicates a logical AND operation; the '+' character indicates a logical OR operation; and the '!' character indicates a logical NOT operation.

As alluded to above, a lane pointer is used to indicate whether a given output lane is to receive Chunk0, Chunk1, Chunk2 or Chunk3 (bubble insertion overrides the delivery of a chunk to an output lane). FIG. 9 is a table that indicates the next value of the lane pointer (NXT_PTR) for a given output lane. In one embodiment, the next lane pointer value is a function of the state of the corresponding lane select state machine and the indicated conditions. For example, as shown by row two of the table, if the lane select state machine for the output lane is in the Packet state, the next value of the lane pointer is equal to the new count (NEW_CNT) mod 4 (i.e., remainder of integer division of new count by four), if the new count is greater than three and the packet-available signal is asserted. As discussed above, the new count is the sum of the current value of the lane pointer and the next memory clock count. As another example, as shown by row eight of the table, if the lane state machine is in the Hold state, and the new count is greater than three, but the packet-available signal is deasserted (pavail=='0'), then the lane pointer will be assigned the lane id (i.e., zero for Lane0, 1 for Lane1, 2 for Lane2, and 3 for Lane3). According to one embodiment, the various conditions are combined with the state of the lane select state machine for each output lane to generate the next lane pointer in accordance with the table in FIG. 9. In some cases, conditions may be combined for more efficient implementation.

Figure 10:
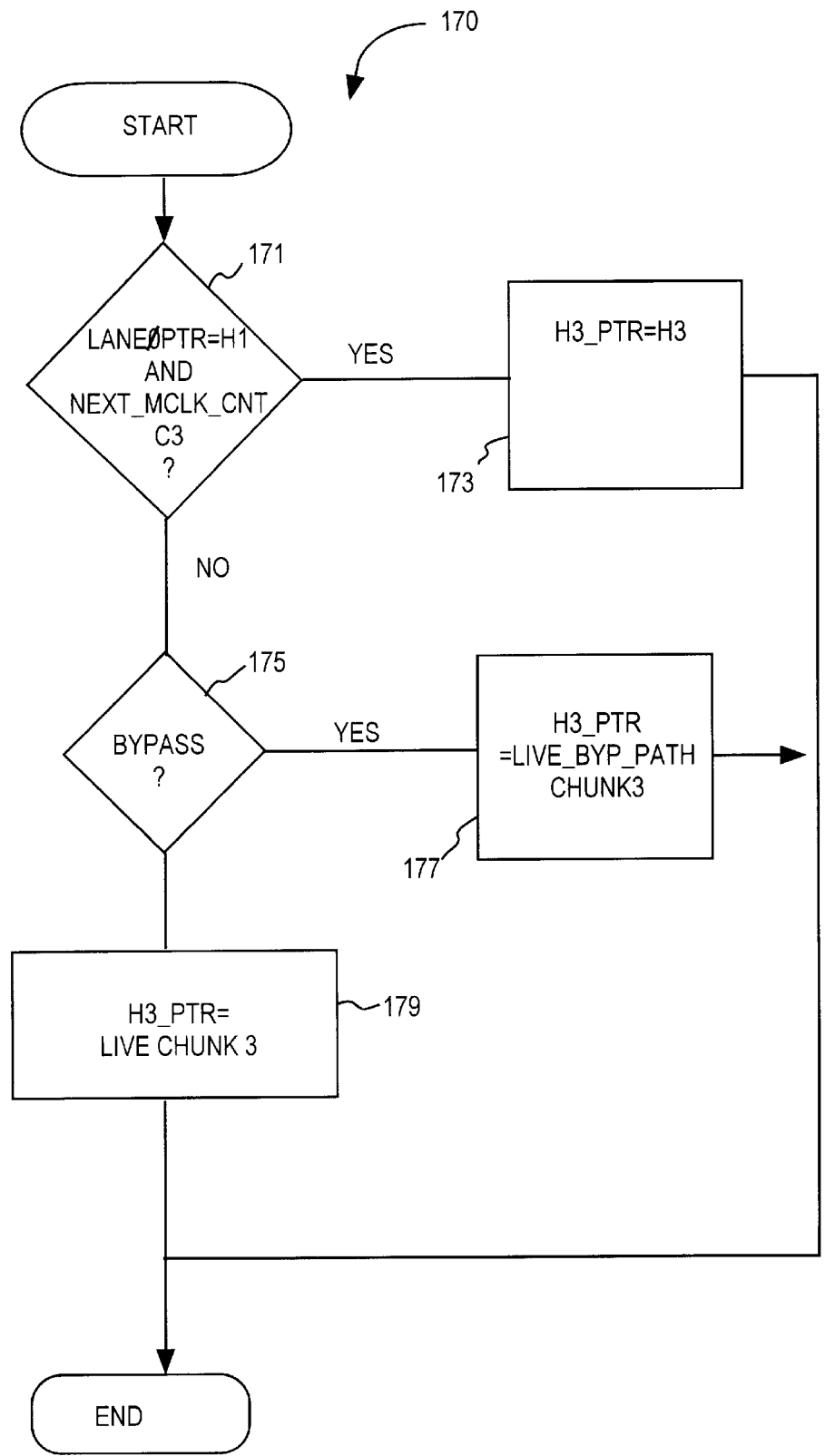
FIG. 10 is a logic diagram that illustrates generation of a hold select signal for a storage element in the hold logic.

FIG. 10 is a logic diagram that illustrates generation of the hold select signal for the storage element H3 of hold logic 85. At decision block 171, the setting of the lane pointer for output Lane0 is evaluated to determine if it points to storage element H1. If so, and if the next memory clock count is less than three, then the present content of storage element H3 will be needed during the next cycle of the host clock. Consequently, at block 173, the select pointer for storage element H3 (i.e., multiplexer 101 of FIG. 4) is configured to recirculate the content of the H3 storage element. If the lane pointer for output Lane0 is not pointed at storage element H1, or if the next memory clock count is not less than three, then the bypass signal is evaluated at decision block 175 to determine if a live bypass operation is to be performed. If the bypass signal is asserted (and bypass has not been not disabled), then the select pointer for storage element H3 is configured at block 177 to store chunk3 from the live bypass path. If the bypass signal is not asserted (or bypass has been disabled), then the select pointer for storage element H3 is configured at block 179 to store a live chunk3 from the packet queue.

Figure 11:
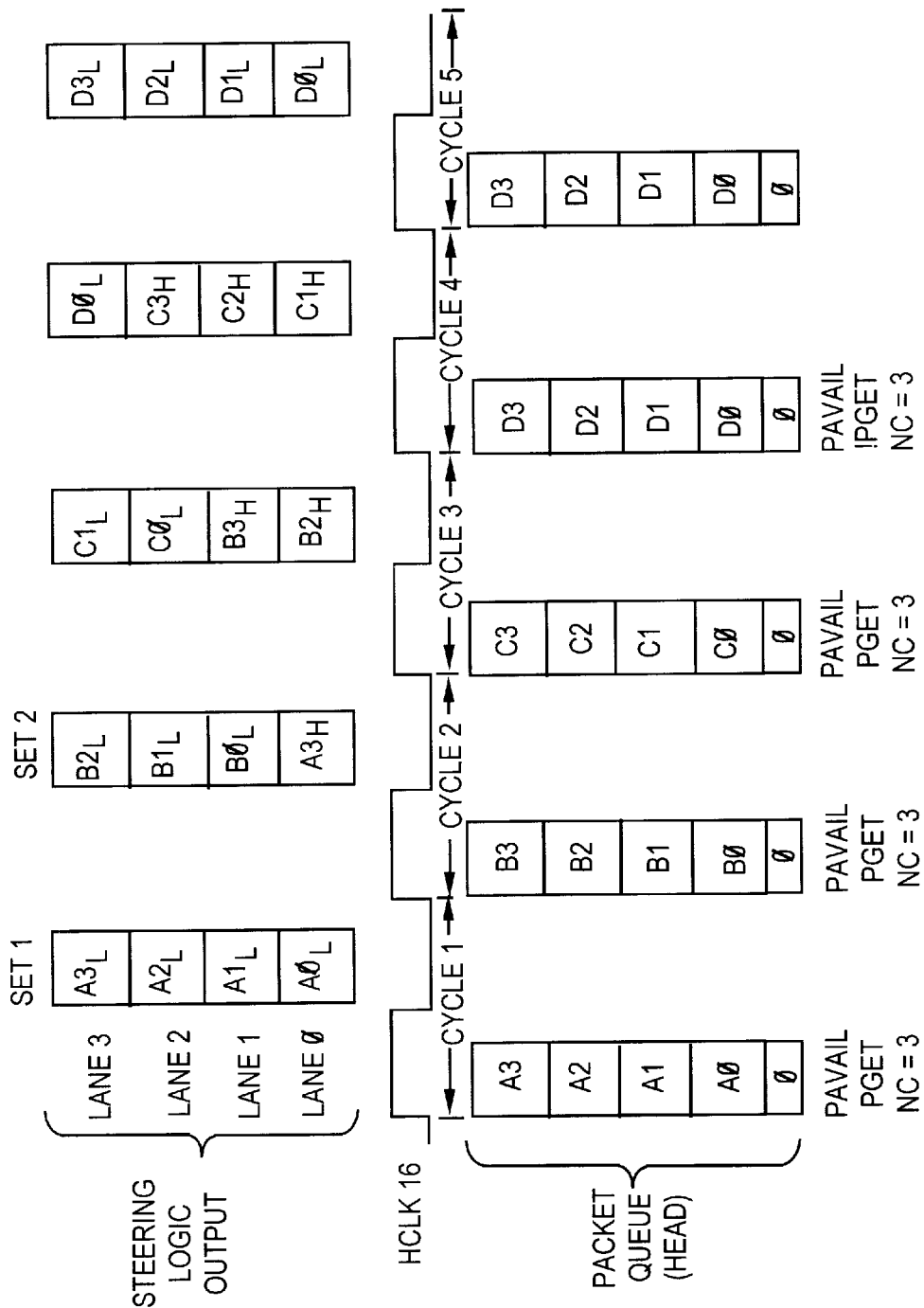
FIG. 11 illustrates an first exemplary shifting of packet chunks through the output lanes of the steering logic.

FIG. 11 illustrates an exemplary shifting of packet chunks through the output lanes of the steering logic when the frequency ratio of the memory clock 17 to the host clock 16 is 3:1. At the start of Cycle1 of the host clock 16, the entry at the head of the packet queue contains packet A, including chunks A0–A3. The entry at the head of the packet queue also contains a bubble vector indicating that zero null chunks are to be prepended to packet A before it is output to the memory-side control logic 22. Sometime later in Cycle1 of the host clock 16, chunks A0–A3 of packet A appear at output lanes Lane0–Lane3, respectively, of the steering logic. The subscript "L" on each of the chunks of packet A at the steering logic output indicates that the chunks are obtained from a live packet (i.e., a packet at the head of the packet queue). Because the packet queue contains at least packet A, the packet-available signal (PAVAIL) is asserted. Also, because the next memory clock count (abbreviated as NC in FIG. 11) is three, the push state machine determines that at least one chunk of the current live packet (i.e., packet A) will be consumed by the shift logic after the current set of chunks (set1) is loaded into the shift logic and before the next set of chunks (set2) is loaded into the shift logic (i.e., at least one chunk of packet A will be "consumed before subsequent load"). Consequently, the push state machine asserts the packet-get signal (PGET) to advance the next packet to the head of the packet queue.

In response to the packet-get signal, packet B becomes the new live packet during Cycle2 of the host clock 16 and the packet-available signal remains asserted. Because chunks A0–A2 of packet A have been consumed, but not A3, A3 is repeated in the steering logic output during Cycle2 of the host clock. Because packet A is no longer live, A3 is selected from a storage element in the hold logic (hence the subscript H) and rotated to Lane0, the highest priority output lane. Because the bubble vector associated with live packet B indicates that no null chunks are to be prepended to packet B, the first three chunks of live packet B (i.e., B0, B1 and B2) are also presented at the steering logic output in Cycle2, but at the lower priority output lanes, Lane1–Lane3. Because the next memory clock count is three, the push state machine determines that chunks B0 and B1 of packet B (along with A3 of packet A) will be consumed before subsequent load. Consequently, the push state machine asserts the packet-get signal (PGET) to advance the next packet to the head of the packet queue.

In response to the packet-get signal, packet C becomes the new live packet during Cycle3 of the host clock 16 and the packet-available signal remains asserted. Because chunks A3, B0 and B1 will be consumed prior to the next load operation, chunks B2 and B3 are selected from the hold logic (packet B is no longer live) and steered to the Lane0 and Lane1 outputs, respectively. Because the bubble vector associated with live packet C indicates that no null chunks are to be prepended to packet C, chunks C0 and C1 of the live packet C are steered to the Lane2 and Lane3 outputs. Further, because the next memory clock count is three, the push state machine determines that chunk C0 of packet C (as well as chunks B2 and B3 of packet B) will be consumed before subsequent load. Consequently, the push state machine asserts the packet-get signal to advance the next packet to the head of the packet queue.

In response to the packet-get signal, packet D becomes the new live packet in Cycle4 of the host clock 16 and the packet-available signal remains asserted. Because chunks B2, B3 and C0 will be consumed prior to subsequent load, chunks C1, C2 and C3 are selected from the hold logic (packet C is no longer live) and steered to the Lane0, Lane1 and Lane2 outputs, respectively. Because the bubble vector associated with live packet D indicates that no null chunks are to be prepended to packet D, chunk D0 of the live packet D is steered to the Lane3 output. The next memory clock count remains at three, so that the push state machine determines that chunks C1, C2 and C3 will be consumed before subsequent load, but not chunk D0. Consequently, the push state machine deasserts the packet-get signal (shown by !PGET in FIG. 11) so that packet D remains live. Thus, during Cycle5 of the host clock 16, packet D remains at the head of the packet queue and chunks D0–D3 are output at Lane0–Lane3, respectively, later in cycle 5.

Figure 12:
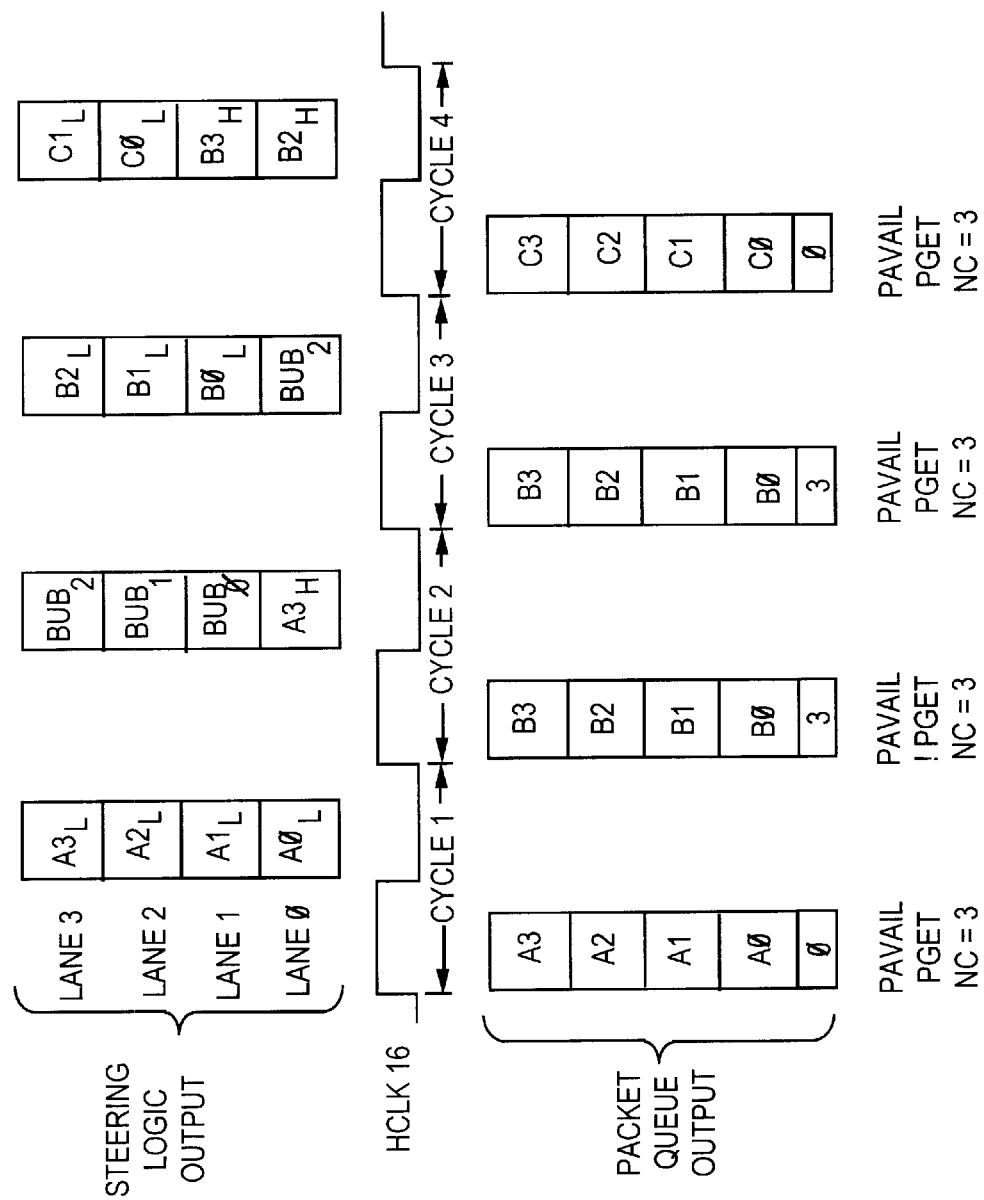
FIG. 12 illustrates a second exemplary shifting of packet chunks through the output lanes of the steering logic.

FIG. 12 illustrates another exemplary shifting of packet chunks through the output lanes of the steering logic at the 3:1 memory clock 17 to host clock 16 ratio, but in this example, the bubble vectors for packets B and D are nonzero.

During Cycle1 of the host clock 16, live packet A is steered to the output lanes by the steering logic. The packet-available signal is asserted because the packet queue contains a packet, and the packet-get signal is asserted because chunks A0, A1 and A2 will be consumed before subsequent load (next memory clock count is three in each cycle of this example).

In response to the packet-get signal, packet B becomes the new live packet in Cycle2 of the host clock 16 and the packet-available signal remains asserted. Unconsumed chunk A3 is selected from the hold logic (packet A is no longer live) and steered to the Lane0 output. Because the bubble vector associated with packet B indicates that three null chunks are to be prepended to packet B, the Lane1, Lane2 and Lane3 outputs are nulled. These null chunks are indicated by the labels BUB0, BUB1, and BUB2 in FIG. 12. Because no chunks from packet B will be consumed before subsequent load, the packet-get signal is deasserted in Cycle2 of the host clock 16 so that packet B remains live in Cycle3. Because the next memory clock count is three, chunks A3, BUB0 and BUB1 will be consumed before subsequent load, but not BUB2. Consequently, during Cycle3 of the host clock 16, BUB2 (i.e., a null chunk) is output at Lane0, and chunks B0, B1 and B2 of live packet B are output at Lane1, Lane2 and Lane3, respectively. Because chunks B0 and B1 of packet B will be consumed before subsequent load, the packet-get signal is asserted to advance packet C to the head of the queue in Cycle4. The bubble vector associated with packet C is zero, indicating that no null chunks are to be prepended to packet C. Consequently, the unconsumed chunks of packet B (i.e., B2 and B3) are steered from respective storage elements in the hold logic to the Lane0 and Lane1 outputs, while chunks C0 and C1 from live packet C are steered to the lower priority Lane2 and Lane3 outputs. Because chunks B2, B3 and C0 will be consumed before subsequent load, the packet-get signal is asserted to advance the next packet to the head of the packet queue and shifting of chunks through the output lanes of the steering logic 83 continues.

Figure 13:
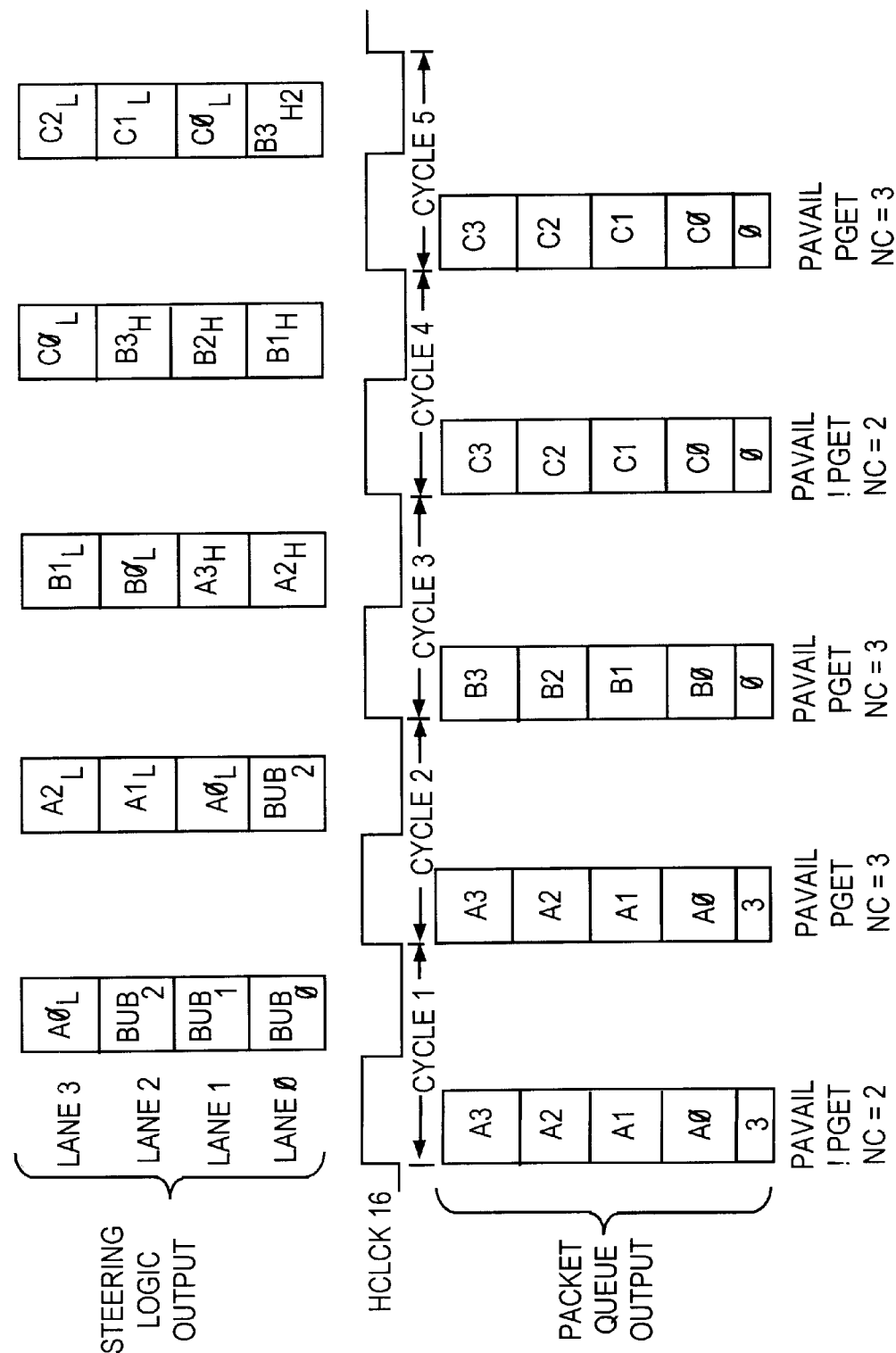
FIG. 13 illustrates a third exemplary shifting of packet chunks through the output lanes of the steering logic.

FIG. 13 illustrates the operation of the row push controller 27 when the frequency ratio of the memory clock 17 to the host clock 16 is 8:3. In this clock ratio, a varying number of packet chunks are consumed per host clock 16. During Cycle1 of the host clock 16, packet A appears at the head of the packet queue with a bubble vector of three. Assuming that there are no chunks from a preceding packet that remain to be output, null chunks BUB0, BUB1 and BUB2 are output on Lane0, Lane1 and Lane2 of the steering logic, and A0 of live packet A is output on Lane3. The next memory clock count (NC) is two, so that null chunks BUB0 and BUB1 will be consumed before subsequent load, but not chunks BUB2 or A0. Because none of the packet A chunks will be consumed before subsequent load, the packet-get signal is deasserted so that packet A remains the live packet during Cycle2 of the host clock 16.

In Cycle2, null chunk BUB2 is output on Lane0 of the steering logic and chunks A0, A1 and A2 from live packet A are output on Lane1, Lane2 and Lane3, respectively. The next memory clock count is three, so that chunks BUB2, A0 and A1 will be consumed before subsequent load. Consequently, the packet-get signal is asserted to advance packet B to the head of the packet queue for Cycle3 of the host clock 16.

During Cycle3, the unconsumed chunks from packet A (i.e., A2 and A3) are steered from respective storage elements in the hold logic to the Lane0 and Lane1 outputs of the steering logic. Because the bubble vector associated with live packet B is zero, chunks B0 and B1 from packet B are output at Lane2 and Lane3, respectively. The next memory clock count is three, so that chunks A2, A3 and B0 will be consumed before subsequent load. Consequently, the packet-get signal is asserted to advance packet C to the head of the packet queue for Cycle4 of the host clock 16.

During Cycle4, the unconsumed chunks from packet B (i.e., B1, B2 and B3) are steered from respective storage elements in the hold logic to the Lane0, Lane1 and Lane2 outputs. Because the bubble vector associated with live packet C is zero, chunk C0 from packet C is output at Lane3. The next memory clock count is two, so that chunks B1 and B2, but not B3 or C0, will be consumed before subsequent load. Because B3 was obtained from the hold logic during Cycle4, but will be needed for yet another cycle of the host clock 16, B3 is recirculated in the hold logic 85. Because none of the chunks of packet C will be consumed before subsequent load, the packet-get signal is deasserted during Cycle4 so that packet C will remain live during Cycle5 of the host clock 16.

In Cycle5, the recirculated chunk B3 is steered from the hold logic to the Lane0 output of the steering logic, and chunks C0, C1 and C2 are steered from the head of the packet queue to the Lane1, Lane2 and Lane3 outputs, respectively. The next memory clock count is three, so that chunks B3, C0 and C1 will be consumed before subsequent load. Consequently, the packet-get signal is asserted to advance a new packet to the head of the packet queue for the next cycle of the host clock 16 and rotation of packet chunks through the output lanes continues.

Figure 14:
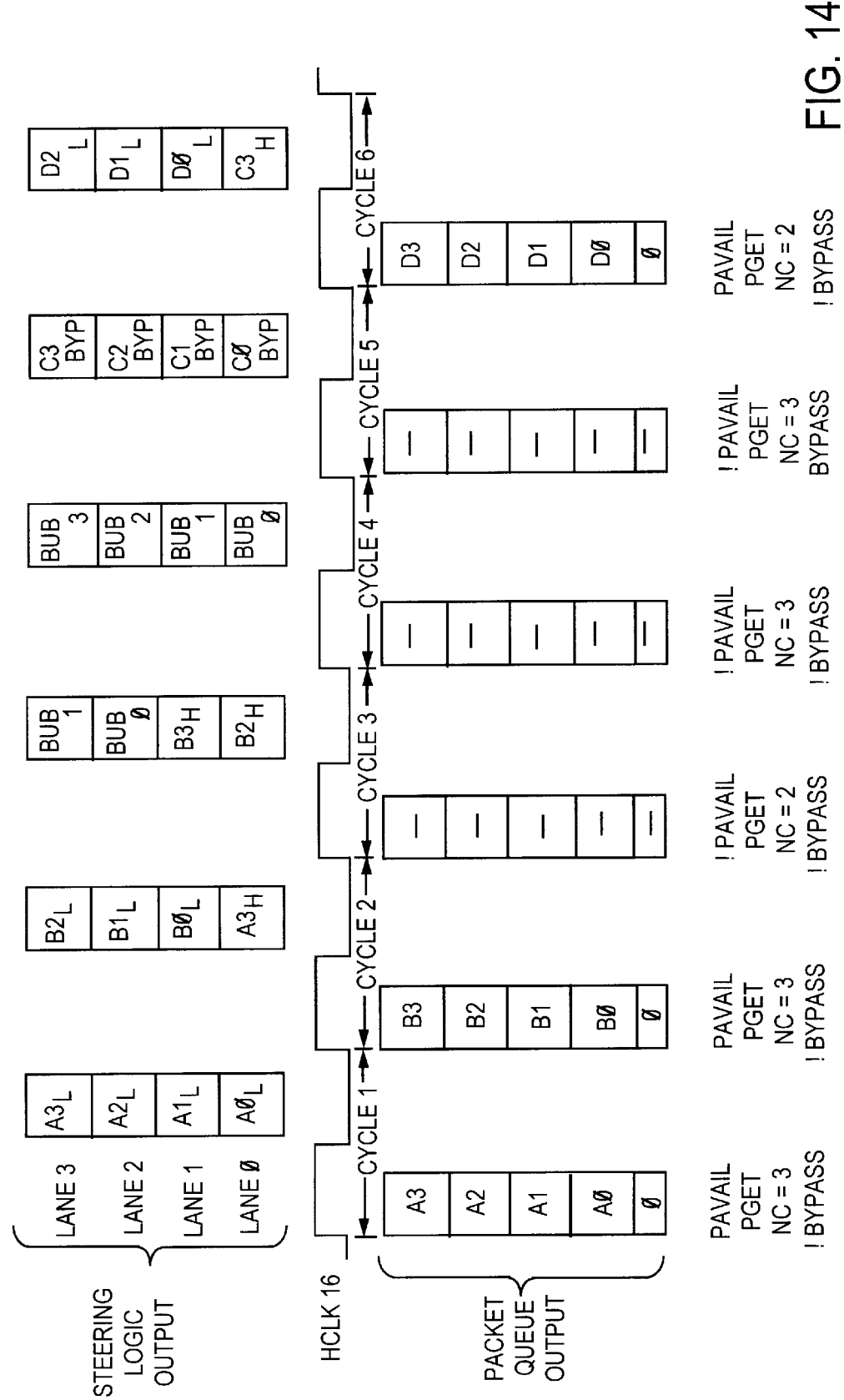
FIG. 14 illustrates a fourth exemplary shifting of packet chunks through the output lanes of the steering logic.

FIG. 14 illustrates a live bypass operation. During Cycle1 of the host clock 16, packet A is the live packet and chunks A0–A3 are output at Lane0"Lane3 of the steering logic. The packet-available signal is asserted to indicate that a packet is present in the packet queue. The next memory clock count is three, so that chunks A0, A1 and A2 will be consumed before subsequent load. Consequently, the packet-get signal is asserted to advance packet B to the head of the packet queue for Cycle2 of the host clock 16. As shown, the bypass signal is deasserted (!BYPASS) during Cycle1. (Although the state of the bypass signal was not explicitly shown in FIGS. 10, 11 and 12, the bypass signal was assumed to be deasserted throughout those examples).

In Cycle2 of the host clock 16, previously loaded, but unconsumed chunk A3 is steered from the hold logic to Lane0 of the steering logic, and chunks B0, B1 and B2 are steered from the packet queue to the Lane1, Lane2 and Lane3 outputs, respectively. The packet-available signal remains asserted because packet B is present at the head of the packet queue. The next memory clock count is three, so that chunks A3, B0 and B1 will be consumed before subsequent load. Consequently, the packet-get signal is asserted to advance the next packet to the head of the packet queue for Cycle3 of the host clock 16. The bypass signal remains deasserted during Cycle2.

Assuming that packet B was the last packet in the packet queue, then the assertion of the packet-get signal during Cycle2 of the host clock 16 causes the packet queue to become empty during Cycle3. Consequently, the packet-available signal is deasserted to inform the push state machine that there is no packet at the head of the packet queue. The push state machine responds to the deassertion of the packet-available signal by steering the unconsumed chunks of packet B (i.e., B2 and B3) to Lane0 and Lane1 of the steering logic, and by steering null chunks BUB0 and BUB 1 to Lane2 and Lane3. Because the next memory clock count is two, chunks B2 and B3 will be consumed before subsequent load, but not the null chunks BUB0 and BUB1. The packet-get signal remains asserted to indicate the need for a live packet. The bypass signal remains deasserted.

During Cycle4 of the host clock 16, the packet-available signal remains deasserted and the push state machine responds by outputting null chunks (i.e., BUB0–BUB4) on all four lanes of the steering logic. The next memory clock count is three, so that three null chunks (BUB0, BUB1 and BUB2) will be consumed before subsequent load. Note that, despite the insertion of null chunks, a steady stream of chunks continues to be output to the memoryside control logic. The packet-get signal remains asserted and the bypass signal remains deasserted during Cycle4.

During Cycle5 of the host clock 16, the packet-available signal remains deasserted, but the bypass signal is asserted to indicate that a packet is available on the live bypass path. The push state machine responds to the bypass signal by steering chunks C0–C3 of packet C from the bypass path to the Lane0–Lane3 outputs of the steering logic. The next memory clock count is three, so that chunks C0, C1 and C2 will be consumed before subsequent load. Chunk C3 is stored in the hold logic. The packet-get signal remains asserted to indicate that a new live packet is needed.

In cycle6 of the host clock 16, packet D is made available at the head of the packet queue 63, so that the packet-available signal is asserted. Chunk C3 from packet C will not be consumed before the output chunk set of cycle 6 is loaded. Consequently, chunk C3 is steered from the hold logic to Lane0 of the steering logic, while chunks D0, D1 and D2 are steered from the head of the packet queue to the Lane1, Lane2 and Lane3 outputs, respectively. The next memory clock count is two, so that chunks C3 and D0 will be consumed before subsequent load. Consequently, the packet-get signal is asserted to advance a new packet, if available, to the head of the packet queue. The bypass signal is deasserted to indicate the absence of a packet on the live bypass path.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method of transferring units of information between clock domains in a memory system, the method comprising:
    loading a respective set of N units of information from an output circuit in a first clock domain into a storage circuit in a second clock domain during each clock cycle of the first clock domain; and
    the output circuit selecting each respective set of N units of information to include
        units of information that have previously been loaded into the storage circuit and that will not be output from the storage circuit prior to the storage circuit being loaded with a subsequent set of N units of information, and
        a complement number of units of information that have not previously been loaded into the storage circuit.

2. The method of claim 1 wherein the storage circuit is a shift circuit and wherein units of information are shifted out of the shift circuit in response to transitions of a clock signal in the second clock domain.

3. The method of claim 1 wherein selecting each respective set of N units of information comprises issuing select signals to steering logic to select a respective one of a plurality of sources to supply each unit of information in each respective set of N units of information.

4. The method of claim 1 further comprising generating a count value that indicates how many units of information M of each set of N units loaded into the storage circuit will be output from the circuit prior to the storage circuit being loaded with a subsequent set of N units of information, wherein the complement number of units of information includes M units of information.

5. The method of claim 4 wherein M is determined based on relative clock frequencies of the first clock domain and the second clock domain.

6. The method of claim 4 wherein the count value is regenerated for each clock cycle of the first clock domain.

7. The method of claim 6 wherein the count value remains constant over time if the frequency of the second clock domain is an integer multiple of the frequency of the first clock domain.

8. The method of claim 6 wherein the count value varies over time if the frequency of the second clock domain is not an integer multiple of the frequency of the first clock domain.

9. The method of claim 1 wherein selecting each respective set of N units of information comprises selecting units of information from one or more of a plurality of information sources.

10. The method of claim 9 wherein selecting units of information from one or more of a plurality of information sources comprises selecting units of information from one or more of an information queue, a set of hold registers and a source of null data.

11. The method of claim 10 wherein the plurality of information sources further comprises a bypass source that bypasses the information queue.

12. A method of transferring units of information between clock domains in a memory system, the method comprising:

loading a first set of N units of information from an output circuit in a first clock domain into a shift circuit in a second clock domain during a first clock cycle of the first clock domain;

generating a count value, the count value indicating how many units of information M of the first set of N units of information will be shifted out of the shift circuit prior to the shift circuit being loaded with a second set of N units of information in a second clock cycle of the first clock domain; and loading the second set of N units of information from the output circuit into the shift circuit during the second clock cycle, the second set of N units including M units of information not previously loaded into the shift circuit and N-M units of information from the first set of N units of information.

* * * * *

UNITED STATES PATENT AND TRADEMARK OFFICE
CERTIFICATE OF CORRECTION

PATENT NO. : 6,128,749
DATED : October 3, 2000
INVENTOR(S) : McDonnell et al.

It is certified that error appears in the above-identified patent and that said Letters Patent is hereby corrected as shown below:

Column 1,
Line 36, delete "frequency between" and insert -- frequency ratio between --.

Column 4,
Line 15, delete "5554" and insert -- 55 54 --.

Signed and Sealed this

Fourth Day of June, 2002

Attest:

JAMES E. ROGAN
Attesting Officer   Director of the United States Patent and Trademark Office